US008555123B2

(12) United States Patent
Wu et al.

(10) Patent No.: US 8,555,123 B2
(45) Date of Patent: Oct. 8, 2013

(54) TEST DEVICE AND METHOD FOR THE SOC TEST ARCHITECTURE

(75) Inventors: Ming-Hsueh Wu, Kaohsiung (TW); Kun-Lun Luo, Hsinchu (TW)

(73) Assignee: Industrial Technology Research Institute, Chutung (TW)

( * ) Notice: Subject to any disclaimer, the term of this patent is extended or adjusted under 35 U.S.C. 154(b) by 0 days.

(21) Appl. No.: 13/404,365

(22) Filed: Feb. 24, 2012

(65) Prior Publication Data

US 2012/0159251 A1  Jun. 21, 2012

Related U.S. Application Data

(63) Continuation-in-part of application No. 12/434,674, filed on May 3, 2009, now abandoned.

(30) Foreign Application Priority Data

Jul. 23, 2008  (TW) ................................ 97127916 A

(51) Int. Cl.
*G01R 31/28* (2006.01)

(52) U.S. Cl.
USPC ......................................................... 714/727

(58) Field of Classification Search
None
See application file for complete search history.

(56) References Cited

U.S. PATENT DOCUMENTS

| 6,324,614 | B1 | 11/2001 | Whetsel |
| 6,324,662 | B1 | 11/2001 | Haroun et al. |
| 6,381,717 | B1 | 4/2002 | Bhattacharya |
| 6,425,100 | B1 | 7/2002 | Bhattacharya |
| 6,829,730 | B2 | 12/2004 | Nadeau-Dostie et al. |
| 7,010,722 | B2 | 3/2006 | Jahnke |
| 7,058,862 | B2 | 6/2006 | Whetsel et al. |
| 2008/0034262 | A1 | 2/2008 | Whetsel |
| 2008/0172586 | A1 | 7/2008 | Whetsel |

FOREIGN PATENT DOCUMENTS

| TW | I231372 | 4/2005 |
| TW | 200739109 A | 10/2007 |

OTHER PUBLICATIONS

Erik Jan Marinissen, Sandeep Kumar Goel, Maurice Lousberg, Wrapper Design for Embedded Core Test 2000 IEEE pp. 911-920.*
Kuen-Jong Lee, Cheng-I Huang A Hierarchical Test Control Architecture for Core Based Design 2000 IEEE pp. 248-253.*
Kuen-Jong Lee and Cheng-I Huang; "A Hierarchical Test Control Architecture for Core Based Design".
Jin-Fu Li et al.; "A Hierarchical Test Scheme for System-on-Chip Designs".

(Continued)

*Primary Examiner* — Guerrier Merant
(74) *Attorney, Agent, or Firm* — Wang Law Firm, Inc.; Li K. Wang; Stephen Hsu

(57) ABSTRACT

A test device for an SoC test architecture has a test input port, a test output port, a plurality of cores, a register, and a plurality of user defined logics. The register has a plurality of bits corresponding to the cores. Each of the user defined logics is connected to a corresponding bit of the register and a corresponding one of the cores. Each of the user defined logic receives a plurality of test control signals, and receives the corresponding bit of the register to change values of the test control signals. Outputs of each of the user defined logics are connected to the corresponding core to determine whether a test instruction of the corresponding core is or is not needed to be updated.

11 Claims, 14 Drawing Sheets

(56) References Cited

OTHER PUBLICATIONS

Jaehoon Soon and Sungju Park; "A Simple Wrapped Core Linking Module for SoC Test Access".
"IEEE Standard Test Access Port and Boundary-Scan Architecture", approved Jun. 14, 2001, IEEE Std 1149.1-2001.
"IEEE Standard Testability Method for Embedded Core-based Integrated Circuits", Aug. 29, 2005.
Office Action of corresponding TW application, issued on May 7, 2012.

* cited by examiner

TEST DEVICE AND METHOD FOR THE SOC TEST ARCHITECTURE

CROSS REFERENCE TO RELATED APPLICATIONS

This application is a Continuation-In-Part of application Ser. No. 12/434,674, filed on May 3, 2009, currently pending, the entirety of which is incorporated by reference herein.

TECHNICAL FIELD

The disclosure relates to a test device and method for the SoC test architecture.

BACKGROUND

System-on-a-Chip (SoC) devices are widely used for many applications. With integrating cores from different sources to a single chip, the testing of a core-based SoC design becomes more difficult than before. Therefore, IEEE 1500 test standard, i.e. the test standard for core-based design, has been approved by the IEEE (Institute of Electrical and Electrical and Electronic Engineers) to reduce the test complexity of a SoC device, and reuse the test architecture.

FIG. 1 is a schematic view of a test wrapper for the IEEE 1500 standard. The fault coverage of a SoC device can be improved by using this test architecture.

A test wrapper conforming to IEEE 1500 standard is wrapped around a core. The test wrapper includes an n-bit wrapper instruction register (WIR) (not shown) for storing a test instruction, a 1-bit wrapper bypass register (WBY) (not shown), a wrapper boundary register (WBR) for storing test data, a serial interface layer and a set of standard wrapper serial control (WSC), wherein WIR and WBY are included in the serial interface layer. The test circuit can also access data registers inside the core for testing requirement. This type of data register is called a core data register (CDR).

The architecture of the IEEE 1149.1 standard, as shown in FIG. 2, may also be used for testing a core-based design. The IEEE 1149.1 standard is defined for testing and debugging a chip that is mounted on a printed-circuit board (PCB) thereon. The test wrapper complying with the IEEE 1149.1 standard is composed of a set of Test Access Port (TAP) test signals, a boundary scan register (BSR) connecting input/output (I/O) ports to an internal core, an instruction register (IR), a bypass register, and a TAP controller. The TAP test signals are composed of a Test-Data Input (TDI), a Test-Data-Output (TDO), a Test-Mode-Select (TMS), and a Test-Clock (TCK). An optional Test-Reset (TRST) signal is sometimes included to reset test state. The TAP controller is composed of a finite state machine (FSM) and a state register (SR). The TAP controller receives the TMS (, the TRST,) and the TCK signals to control the content of the SR. The state transition graph of the FSM is as shown in FIG. 3. The BSR receives test data from the TDI and outputs test result to the TDO when the SR is in the Shift-DR state. Similarly, the IR receives test instruction from the TDI and outputs test instruction of other core to the TDO when the SR is in the Shift-IR state.

A data register and corresponding test instructions can be self-defined based on the IEEE 1149.1 standard in addition to mandatory and optional instructions and registers predefined in the specification. Test processes and test data paths of an integrated circuit (IC) can be controlled by using the TAP controller. The IEEE 1149.1 standard can be applied to either testing on a PCB or testing and debugging on a core within a SoC.

However, when more cores are integrated into a SoC, control signals complying with the IEEE 1500 standard inside cores of respective wrappers and the total length of the test registers of the cores are linearly and multiply increased, costing much time for inputting wrapper instruction registers complying with the IEEE 1500 standard while test instructions are updated. Thus, a test device and method for the SoC test architecture is desirable, managing controllers of cores and saving test time.

SUMMARY

An exemplary embodiment consistent with the invention provides a test device for the SoC test architecture comprises m cores, a test input port, a test output port, a register, and m user defined logics, wherein m is an integer. Test outputs of a first core are serial-connected to test inputs of a second core, and test outputs of an $i^{th}$ core of the m cores are serial-connected to test inputs of an $(i+1)^{th}$ core of the m cores, wherein i is an integer between 1 and m-1. The test input port is serial-connected to test inputs of the first core of the m cores, and the test output port is serial-connected to test outputs of an $m^{th}$ core of the m cores. The register comprises m bits corresponding to the cores. Each user defined logics is connected to a corresponding bit of the register and a corresponding one of the cores, receives a plurality of test control signals, and receives the corresponding bit of the register to change values of the test control signals, wherein outputs of each of the user defined logics are connected to the corresponding core to determine whether a test instruction of the corresponding core is or is not needed to be updated.

An exemplary embodiment consistent with the invention provides a test device for the SoC test architecture comprises m cores, a test input port, a test output port, and a register, wherein m is an integer. Test outputs of a first core are serial-connected to test inputs of a second core, and test outputs of an $i^{th}$ core of the m cores are serial-connected to test inputs of an $(i+1)^{th}$ core of the m cores, wherein i is an integer between 1 and m-1. The test input port is serial-connected to test inputs of the first core of the m cores, and the test output port is serial-connected to test outputs of an $m^{th}$ core of the m cores. The register comprises m bits corresponding to the cores, wherein each of the cores comprises an user defined logic connected to a corresponding bit of the register, and receives a plurality of test control signals and the corresponding bit of the register, thereby generate a set of signals to determine whether a test instruction of the each core is or is not needed to be updated.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
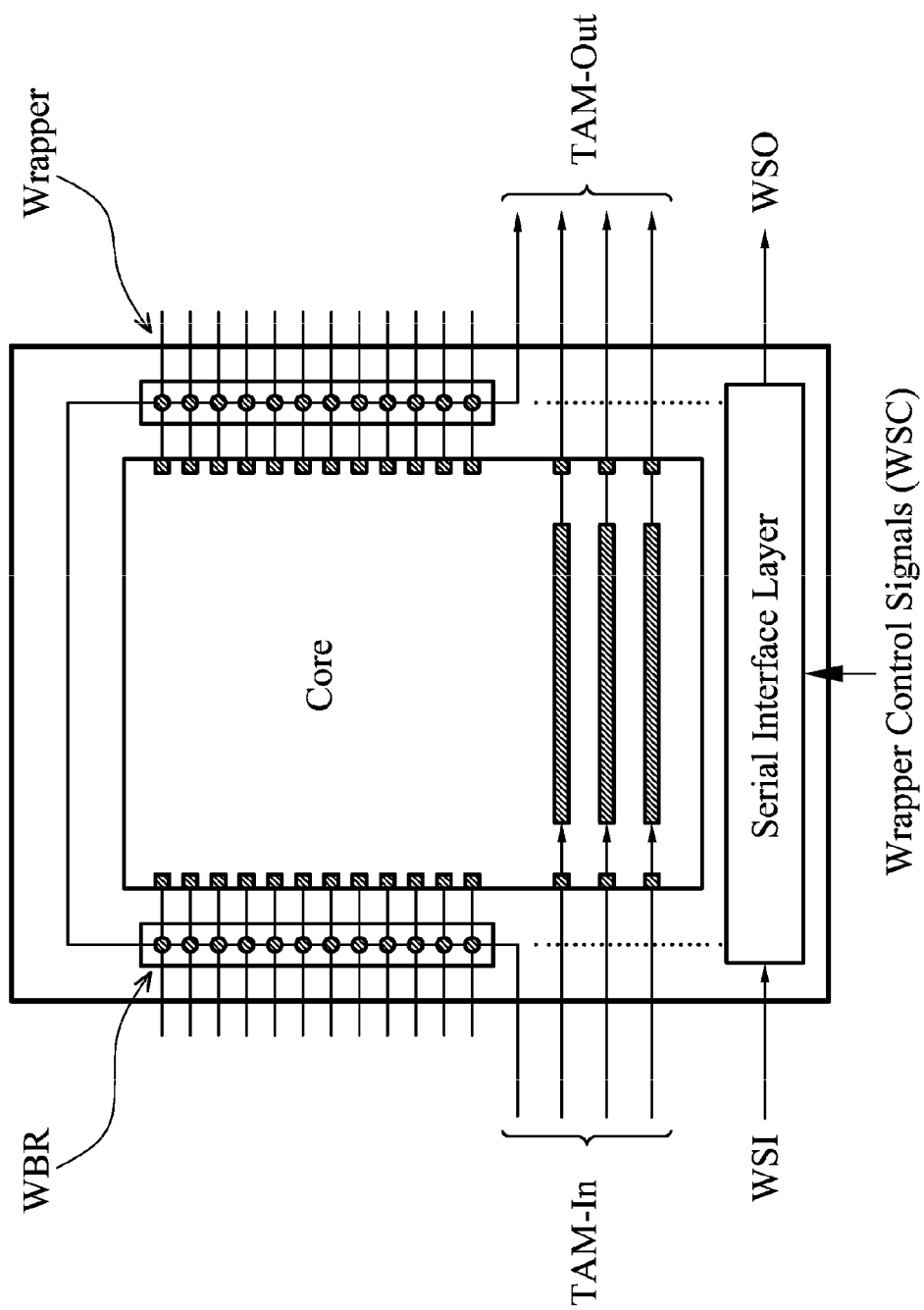
FIG. 1 is a schematic view of a test wrapper for the IEEE 1500 standard.
Figure 2:
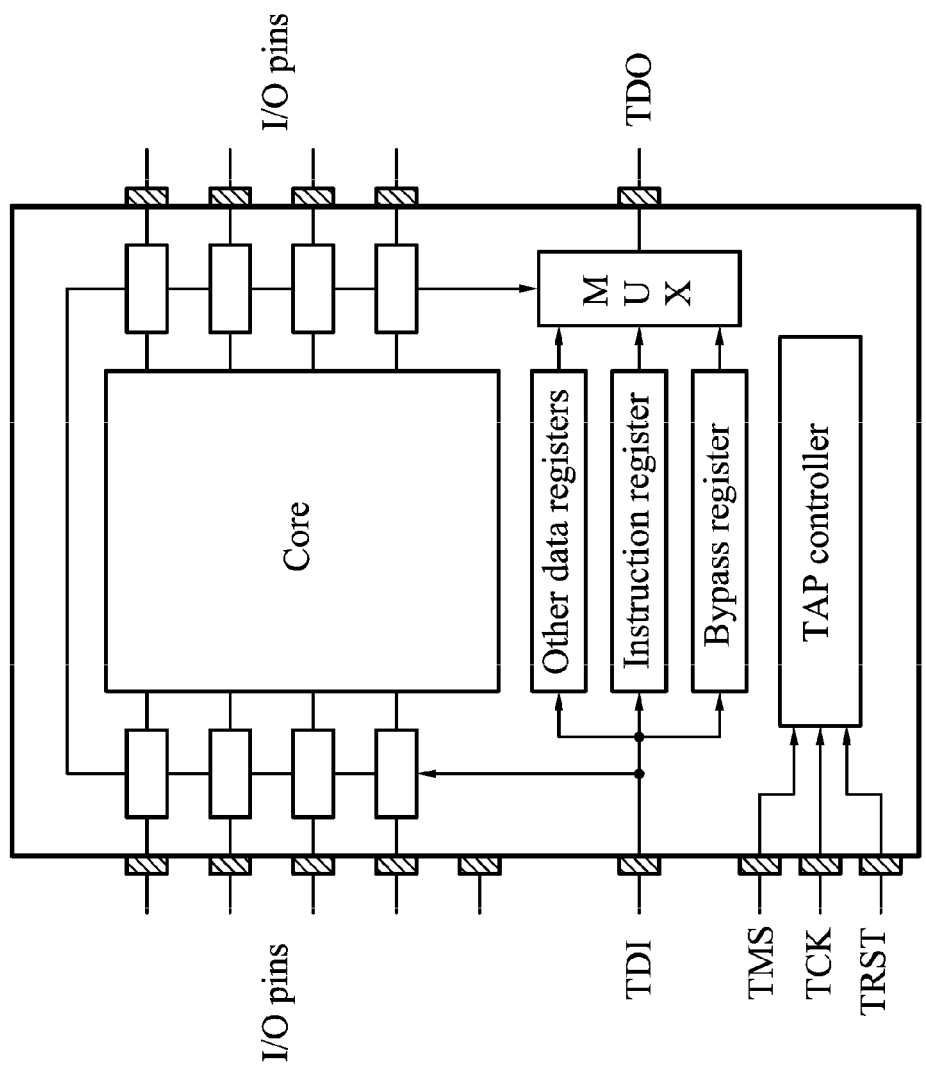
FIG. 2 is a schematic view of a test wrapper comprising a test access port (TAP) complying with the boundary scan standard for the IEEE 1149.1 standard.

Several exemplary embodiments consistent with the invention are described with reference to FIGS. 4 through 14, which generally relate to a test device and method for the SoC test architecture. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The exemplary embodiment consistent with the invention discloses a test device and method for the SoC test architecture.

An embodiment of a test flag controller can manages wrappers complying with the IEEE 1500 test standard to achieve high efficiency for a testing mechanism.

An exemplary embodiment of the method controls testing processes of the overall ICs using a FSM of a TAP complying with the boundary scan standard for the IEEE 1149.1. A new control circuit and test process can be added to a test controller so that wrappers complying with the IEEE 1500 standard can be tested in parallel without changing the FSM of the test controller. Configurable instructions for a test-control flag register and configurable test instructions for a core are added to the test controller so re-programming a core instruction register in which test instructions should be updated is allowed. Thus, under the parallel test architecture, the purpose of inputting less instructions and saving test time can be achieved.

Under the test architecture of a SoC, the TDI port or Wrapper-Serial-Input (WSI) port/TDO port or the Wrapper Serial Output (WSO) port of a test wrapper complying with the IEEE 1149.1/1500 standard can be parallel- or serially-connected. Parallel connection indicates test-data input ports (TDI or WSI) of each core under test are connected to an internal test-data input port which is provided by the test controller for propagating the test-data from external test data input port (TDI) to the cores which are tested, and test-data output ports (TDO or WSO) of each core under test are respectively connected to plural internal test-data output ports which are provided by the test controller. Since there is only one external test data output (TDO), the test-data outputs from each core under test are connected to plural input ports of a multiplexer in the test controller, and the output of multiplexer is controlled by the test controller through a test instruction. Serial connection indicates each core under test provides a test-data input port (TDI or WSI) and a test-data output port (TDO or WSO), and only one test-data input port (TDI or WSI) of a core under test is connected to the internal test-data input port (TDI or WSI) of the test controller and the test-data output port of the core is connected to the test-data input port of the next core, thus serial-connecting all the cores under test one by one. Finally, the test-data output port for the last core is connected to an internal test-data output port of the test controller.

There is only one test controller in the parallel connection architecture. Since every core is tested independently, it needs a unique control circuits for the test controller to control the test inputs and test outputs (WSI/WSO) of each cores respectively. When instructions are input into multiple cores, under the parallel connection architecture of the test controller, cores under test (Select_Core_1, Select_Core_2, . . . ) are selected by sequentially inputting the instructions and the instructions are shifted into an instruction register (WIR) of the selected core. Thus, the testing time based on the parallel connection may not much less than that based on the serial connection, and test instructions and control circuits of the test controller may be substantially increased. In other words, the area of test hardware is increased and the manufacturing cost is also increased, then the total production cost may not be reduced. Thus, compared with the parallel connection, the serial connection is acceptable for the test architecture.

Figure 3:
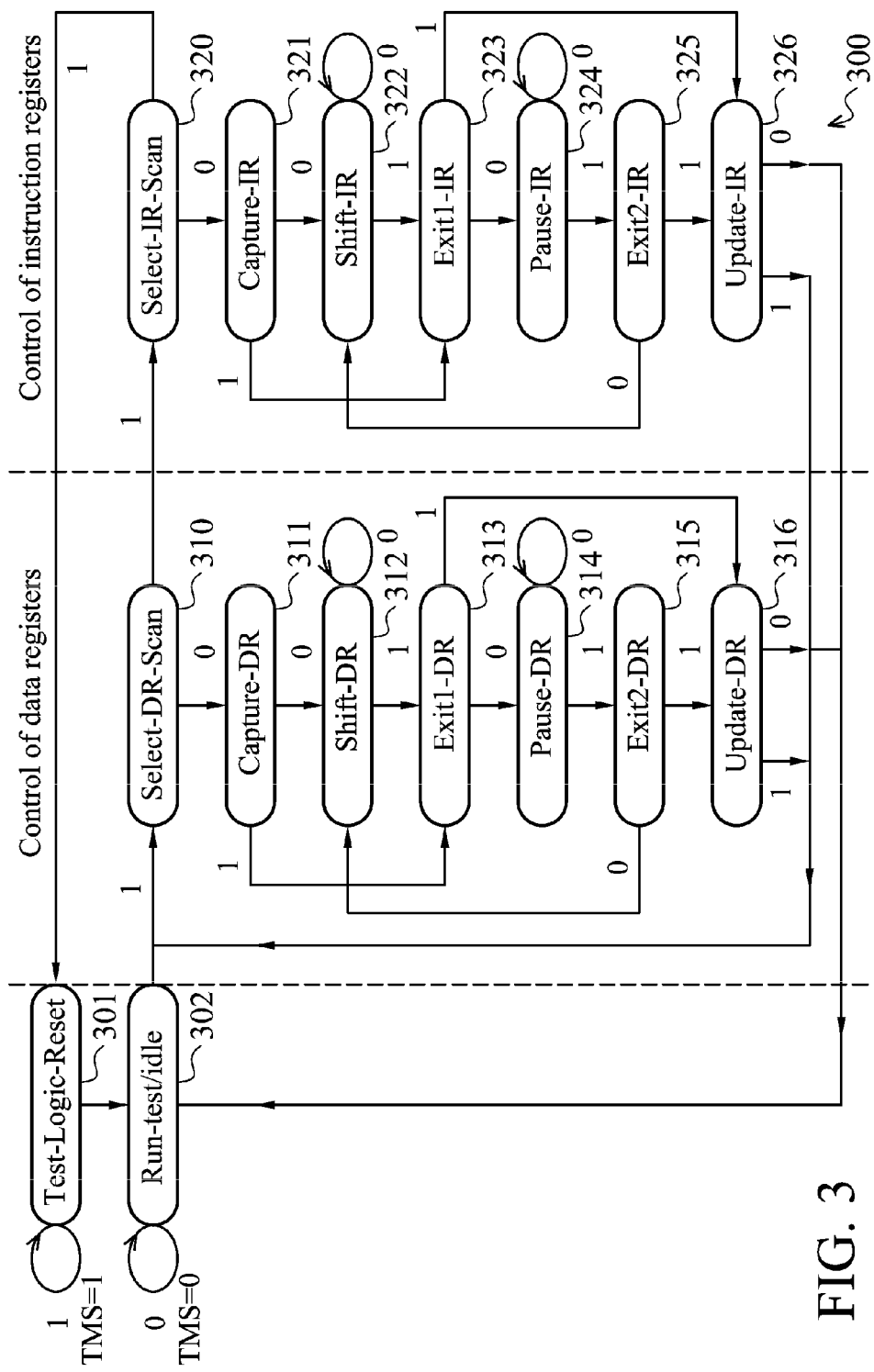
FIG. 3 is a schematic view of operation states of a TAP controller.
Figure 4:
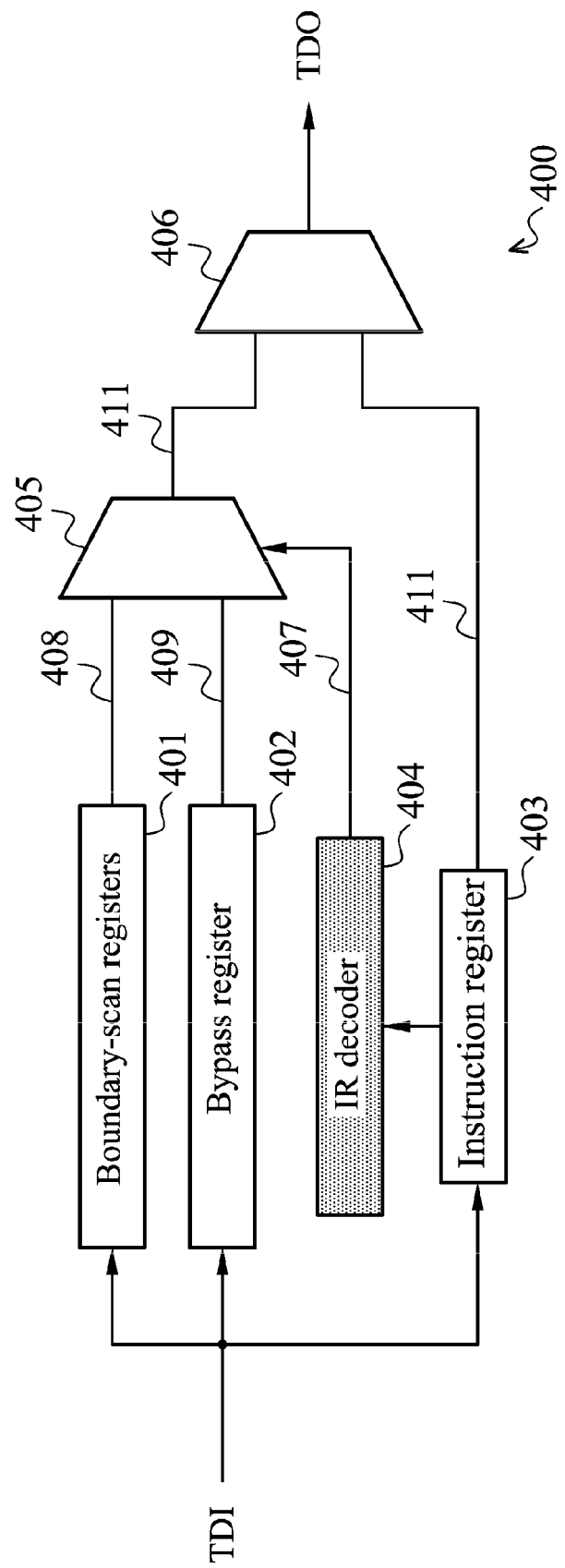
FIG. 4 is a schematic view the architecture of the register of a TAP controller of the exemplary embodiment consistent with the present invention.

The architecture of the register of the TAP controller based on the IEEE 1149.1 standard is shown in FIG. 4. At the beginning of the test process, the state of the TAP controller (as shown in FIG. 3) is converted from the Test-Logic-Reset state to the Shift-IR 322 state (Test-Logic-Reset 301 state→Run-test/idle 302 state→Select-DR-Scan 310 state→Select-IR-Scan 320 state→Capture-IR 321 state→Shift-IR 322 state) by changing the value of the TMS port for scanning one test instruction into the TAP controller. At the Shift-IR 322 state, the test instruction is scanned into the instruction register 403 from the TDI port. After the test instruction has been shifted in the instruction register 403 at the Shift-IR 322 state, the state of the TAP controller is moved to Update-IR 326 state. As the TAP controller operates at Update-IR 326 state, the IR decoder 404 decodes the content of the instruction register 403 and then generates a test control signal 407 to determine a transmission path of the output test data, so the test data from the external TDI input port can be shifted into the boundary scan register 401 or the bypass register 402, when the TAP controller operates at the Shift-DR 312 state later.

Figure 5:
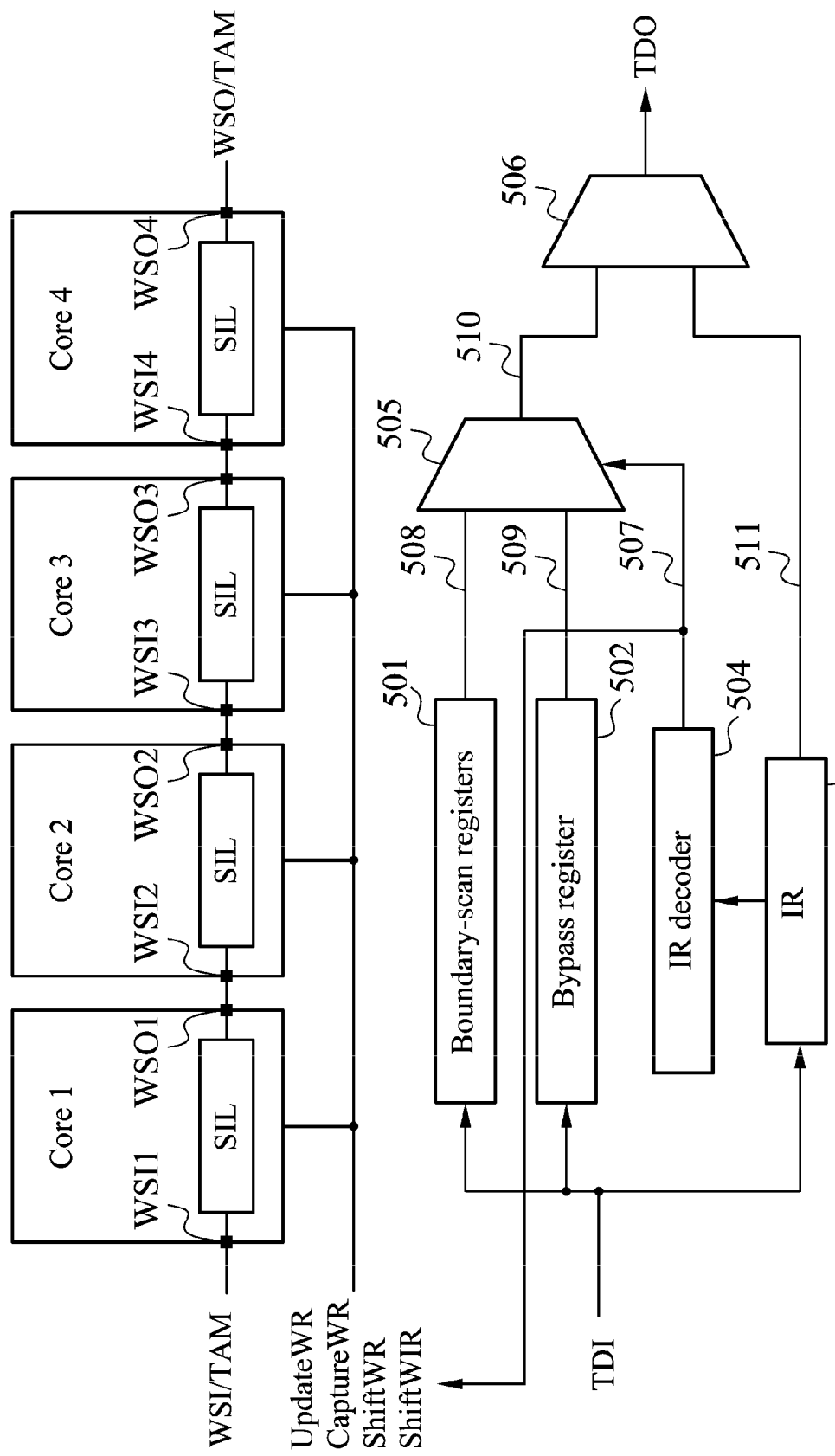
FIG. 5 is a schematic view of a test architecture for the IEEE 1500 standard of the exemplary embodiment consistent with the present invention.

FIG. 5 is a schematic view of the test architecture for the IEEE 1500 standard of the exemplary embodiment consistent with the present invention. The test architecture comprises m cores to be tested, where m is any integer of 2, 3, or 4, etc. The test input port (for example, TDI, WSI, or TAM) is serial-connected to test inputs of first core, and test outputs of the first core are serial-connected to test inputs of a second core. The outputs of an $i^{th}$ core are serial-connected to test inputs of an (i+1)$^{th}$ core, where i is an integer between 1 and m−1. Finally the outputs of an m$^{th}$ core is serial-connected to the test output port (for example, TDO, WSO, or TAM). Under the test environment for the IEEE 1500 standard, WSI/WSO ports of each wrapped cores (as shown in FIG. 1) are serial-connected. Several test control signals include UpdateWR, CaptureWR, ShiftWR, and SelectWIR signals complying with the IEEE 1500 standard are generated by the TAP controller or other logic circuits or directly inputted from external ports, and the test control signals are broadcast to each core under test. Note that the UpdateWR, CaptureWR, and ShiftWR signals act like the Update-DR, Capture-DR, and Shift-DR signals complying with the IEEE 1149.1 standard. The SelectWIR signal determines whether the test instructions can be shifted from the WSI port into WIR of each core. Thus, an instruction code must be specified and added to the TAP controller for executing the described process. Additionally, when the specified instruction is stored in the instruction register, if the state of the TAP controller (as shown in FIG. 3) is shifted to the Update-DR 316 state, Capture-DR 311 state or Shift-DR 312 state, the relative controls signals, the UpdateWR, CaptureWR, or ShiftWR are enabled respectively for testing cores. In the same clock cycle, only one of the UpdateWR, CaptureWR, and ShiftWR signals can be enabled, and the others are kept disabled.

Figure 6:
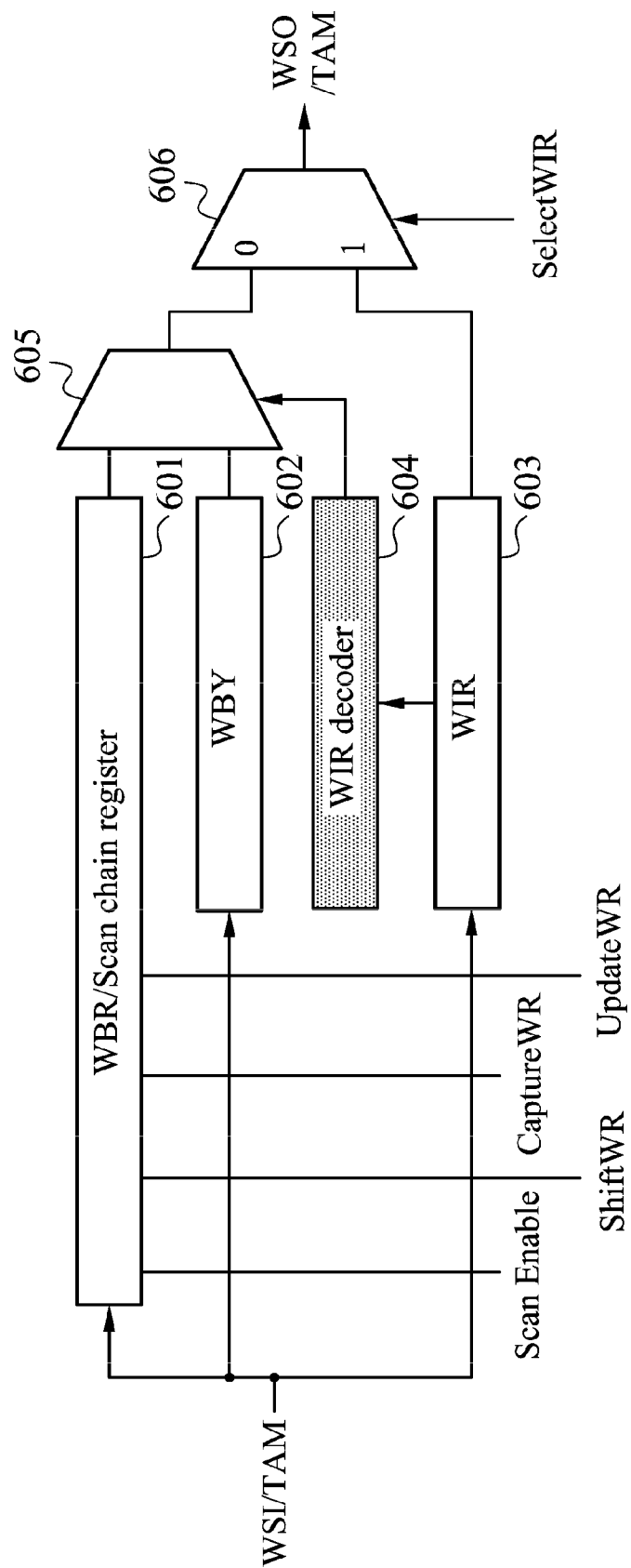
FIG. 6 is a schematic view of a serial interface layer (SIL) within a core of the exemplary embodiment consistent with the present invention.

FIG. 6 is a schematic view of a serial interface layer (SIL) within a core of the exemplary embodiment consistent with the present invention, comprising a wrapper boundary register (WBR)/scan chain register 601, a wrapper bypass register 602, a wrapper instruction register 603, a WIR decoder 604, and two 2-to-1 multiplexers (605 and 606). The architecture of the serial interface layer is similar to that of the register of the TAP controller with providing similar operations. The serial interface layers are located in each core for controlling the test data paths inside the cores while the TAP controller controls test data path between the cores and the data registers of the TAP controller. As shown in FIG. 6, when the SelectWIR signal is represented by 1, the multiplexer 606 outputs the value of the 1-input (denoted as 1 in 606), and a test instruction of a core is shifted from the WSI port to the WSO port through the WIR 603. When the WSI/WSO ports of the cores are serial-connected (for example, the WSI1~WSI4 and WSO1~WSO4 shown in FIG. 5), the test clock number required for shifting a test instruction into each core is equivalent to the total bit number of the wrapper instruction registers 603 of all the cores. Since a SoC is composed of plural cores, a control instruction must be input to enable the instruction inputting process and the test controller must shift all the test instructions of all the wrapper instruction registers inside each core, regardless how many instructions of the cores need to be updated.

Thus, the time for shifting the test instructions is increased when the number of serial-connected cores is increased. However, considering power consumption when testing, only few cores are tested during the test process and other cores are set to be bypassed (IRs or WIRs are set to the BYPASS/WS_BYPASS instructions) for preventing chip damaged by overheating due to great testing power consumption during the test process. Most of the cores are still set to be bypassed, even when changing the target core that will be tested during the next test process, such that the instruction should not be updated.

Figure 7:
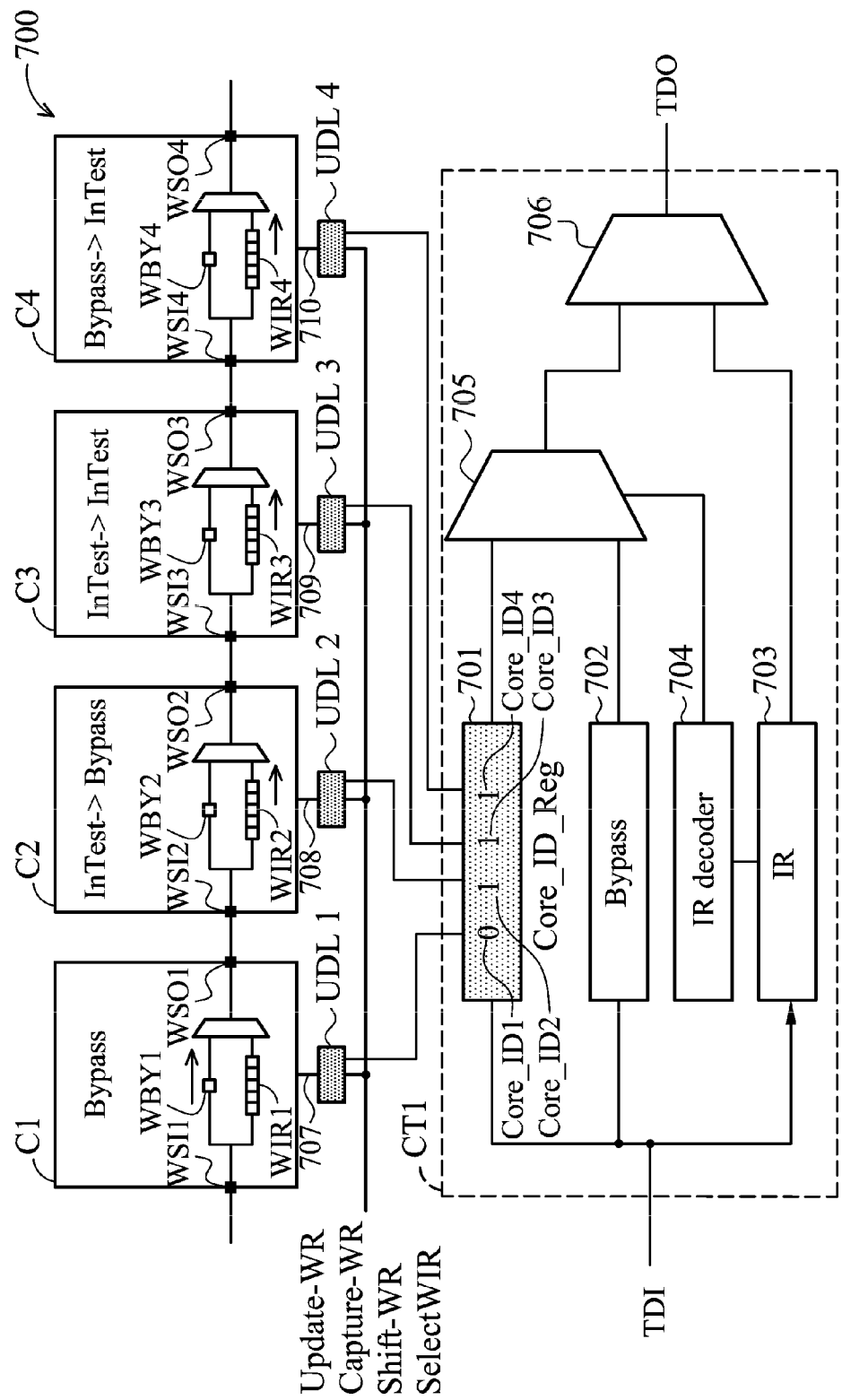
FIG. 7 is a schematic view of another embodiment of a test architecture for the IEEE 1500 standard of the exemplary embodiment consistent with the present invention.

The exemplary embodiment consistent with the invention provides a method for not updating test instructions in WIRs of the cores that remain test condition and rapidly updating test instructions for the cores whose test instructions need to be updated. FIG. 7 is a schematic view of an embodiment of a test architecture for the IEEE 1500 standard of the present invention. For the convenience of description of this invention, the WBR 601 and a multiplexer 605 of SIL in FIG. 6 are not shown in FIG. 7. In an embodiment, the test architecture 700 comprises four cores under test (i.e. C1, C2, C3 and C4), four user defined logics (i.e. UDL1, UDL2, UDL3 and UDL4), a test input port, a test output port and a test controller CT1, wherein the test outputs WSO1, WSO2 and WSO3 are serial-connected to the test inputs WSI2, WSI3 and WSI4 of the cores respectively. Additionally, the test input port WSI is serial-connected to a test input WSI1 of core C1, and the test output port WSO is serial-connected to a test output WSO4 of core C4. In some embodiments, the test architecture 700 may comprise more or fewer cores. The test controller CT1 comprises a register Core_ID_Reg 701, a bypass register 702, an instruction register 703, an instruction register decoder 704 and two multiplexers (705 and 706), wherein the bypass register 702, the instruction register 703, the instruction register decoder 704 and the two multiplexers (705 and 706) are the same as the elements described in FIG. 4. The register Core_ID_Reg 701 comprises 4 bits, Core_ID1, Core_ID2, Core_ID3 and Core_ID4. The cores C1, C2, C3 and C4 are connected to the UDLs UDL1, UDL2, UDL3 and UDL4 respectively. The UDLs are connected to the corresponding bits (outputs) of the register Core_ID_Reg 701. Each UDL (UDL1, UDL2, UDL3 or UDL4) receives test control signals Update-WR, Capture-WR, Shift-WR and SelectWIR and receives the corresponding bit of the Core_ID_Reg 701 register to change the values of the test control signals, which are 707, 708, 709 and 710. Outputs of each of the user defined logics are connected to a corresponding one of the cores to determine whether a test instruction of the corresponding core is or is not needed to be updated. If any one of the cores whose test instruction is a bypass instruction and needed to be updated to another test instruction, or not a bypass instruction, the corresponding bit of the register Core_ID_Reg 701 is set to 1. For example, if the test instruction of the core C2 is updated from an InTest instruction to a bypass instruction, the corresponding bit Core_ID2 of the register Core_ID_Reg 701 is set to 1. If the test instruction of the core C3 is needed to shift an InTest instruction again, the corresponding bit Core_ID3 of the register Core_ID_Reg 701 is set to 1. If the test instruction of the core C4 is updated from a bypass instruction to an InTest instruction, the corresponding bit Core_ID4 of the register Core_ID_Reg 701 is set to 1. If any one of the cores which test instruction is bypass and not needed to be updated, the corresponding bit of the register Core_ID_Reg 701 is set to 0. For example, when the test instruction (i.e. bypass instruction) of the core C1 is not needed to be updated, and the corresponding bit Core_ID1 of the register Core_ID_Reg 701 is set to 0. Thus, the 4 bits of the register Core_ID_Reg 701 are set to 0111 (as shown in FIG. 7), and the test data is shifted from the WSI port to the WSO port through the WBY1, WIR2, WIR3 and WIR4. Accordingly, the bits of the register CoreID_Reg 701 can select whether the test instructions of the cores are needed to be updated or not during a period of time. For example, there are 50 cores, and the test instructions of 30 cores of the 50 cores are not bypass or needed to be updated from a bypass instruction to another test instruction, and the corresponding bits of the register Core_ID_Reg 701 are set to 1 in order to shift test instructions through the WIRs. The bypass instructions of the rest of the 50 cores are not needed to be updated, and the corresponding bits of the register Core_ID_Reg 701 are set to 0 in order to shift test data through the WBYs.

Figure 8:
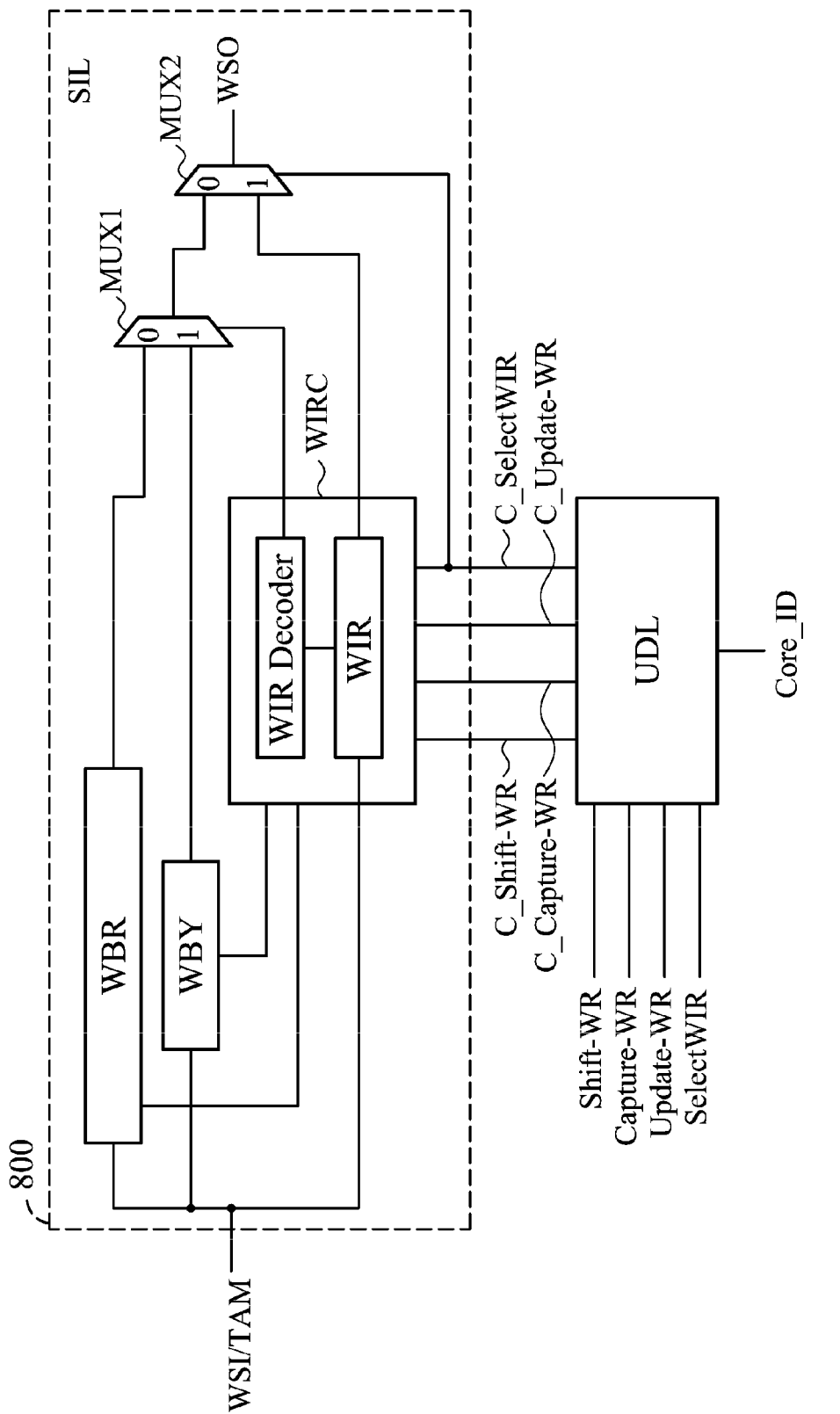
FIG. 8 is a schematic view of a serial interface layer (SIL) within a core and each UDL in FIG. 7 of the present invention.

FIG. 8 is a schematic view of a serial interface layer (SIL) 800 within a core and each UDL in FIG. 7 of the present invention. The elements shown in FIG. 8 are basically the same as the elements shown in FIG. 6, and the difference between FIG. 8 and FIG. 6 is that the SIL 800 is connected to an UDL (i.e. a circuitry WIRC in the SIL 800 is connected to the UDL). The UDL receives four test control signals Shift-WR, Capture-WR, Update-WR, and SelectWIR and receives the corresponding bit (Core_ID) of the register Core_ID_Reg and outputs four signals C_Shift-WR, C_Capture-WR, C_Update-WR and C_SelectWIR to the circuitry WIRC. In an embodiment, the signal C_SelectWIR is generated according to the test control signal SelectWIR and the corresponding bit (Core_ID) of the register Core_ID_Reg. The circuitry WIRC is coupled to the WBR, the WBY and the corresponding user defined logic. The circuitry WIRC receives the signals C_Shift-WR, C_Capture-WR, C_Update-WR and C_SelectWIR. The control terminal of the multiplexer MUX2 is connected to the signal C_SelectWIR. When a test instruction of any one of the cores is needed to be updated, i.e. the UDL sets C_SelectWIR to be 1, the multiplexer MUX2 is set to output the value of 1-input (denoted as 1 in MUX2) and a test instruction is shifted from the WSI port to the WIR. When no test instruction of any one of the cores is not needed to be updated, i.e. the UDL sets C_SelectWIR to be 0, the multiplexer MUX2 is set to output the value of 0-input (denoted as 0 in MUX2) and the test data is shifted from the WSI port to the WSO port through the WBY. The WIR is disabled and the test instruction in the WIR remains unchanged since C_SelectWIR is set to 0.

Figure 9:
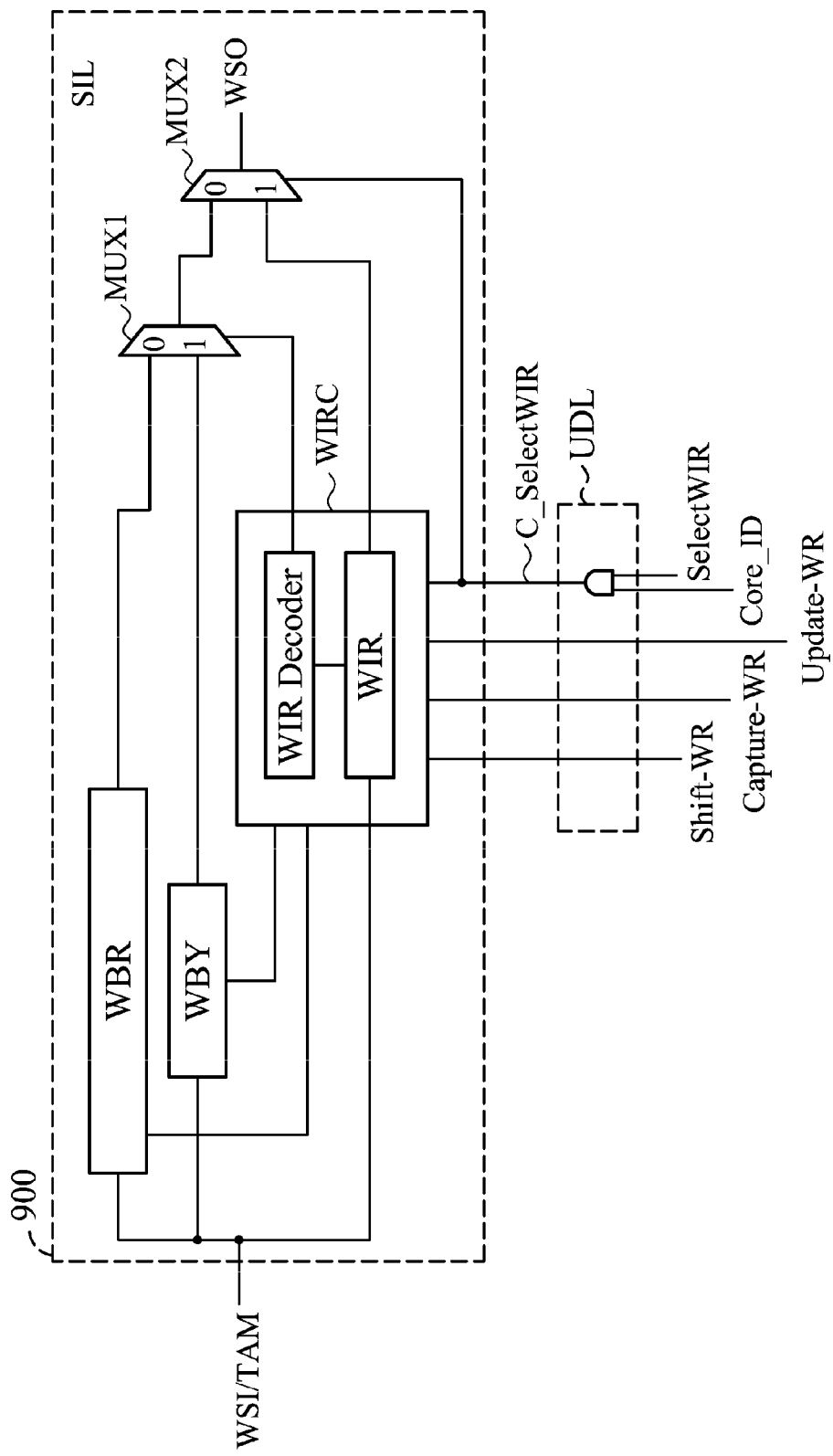
FIG. 9 is a UDL of an embodiment of the present invention.

FIG. 9 shows a UDL of an embodiment of the present invention. The UDL comprises an AND gate. The AND gate receives the test control signal SelectWIR and the bit (Core_ID) of the register Core_ID_Reg, and outputs the signal C_SelectWIR. The Shift-WR is the C_Shift-WR shown in FIG. 8, the Capture-WR is the C_Capture-WR shown in FIG. 8, and the Update-WR is the C_Update-WR shown in FIG. 8. When both of the Core_ID and SelectWIR are equal to 1, the UDL sets the signal C_SelectWIR to 1 so that the multiplexer MUX2 is set to output the value of 1-input (denoted as 1 in MUX2) and a test instruction is shifted from the WSI port to the WIR. When the Core_ID is equal to 0, the UDL sets the signal C_SelectWIR to 0 so that the multiplexer MUX2 is set to output the value of 0-input (denoted as 0 in MUX2), and the multiplexer MUX1 is set to output the value of 0-input (denoted as 0 in MUX1) or 1-input (denoted as 1 in MUX1) and the WIR decoder enables the WBY the instruction of the WIR is the bypass test instruction. In other words, when the Core_ID is equal to 0, the path of the test data still remains as being from the WSI port to the WSO port through the WBY.

Figure 10:
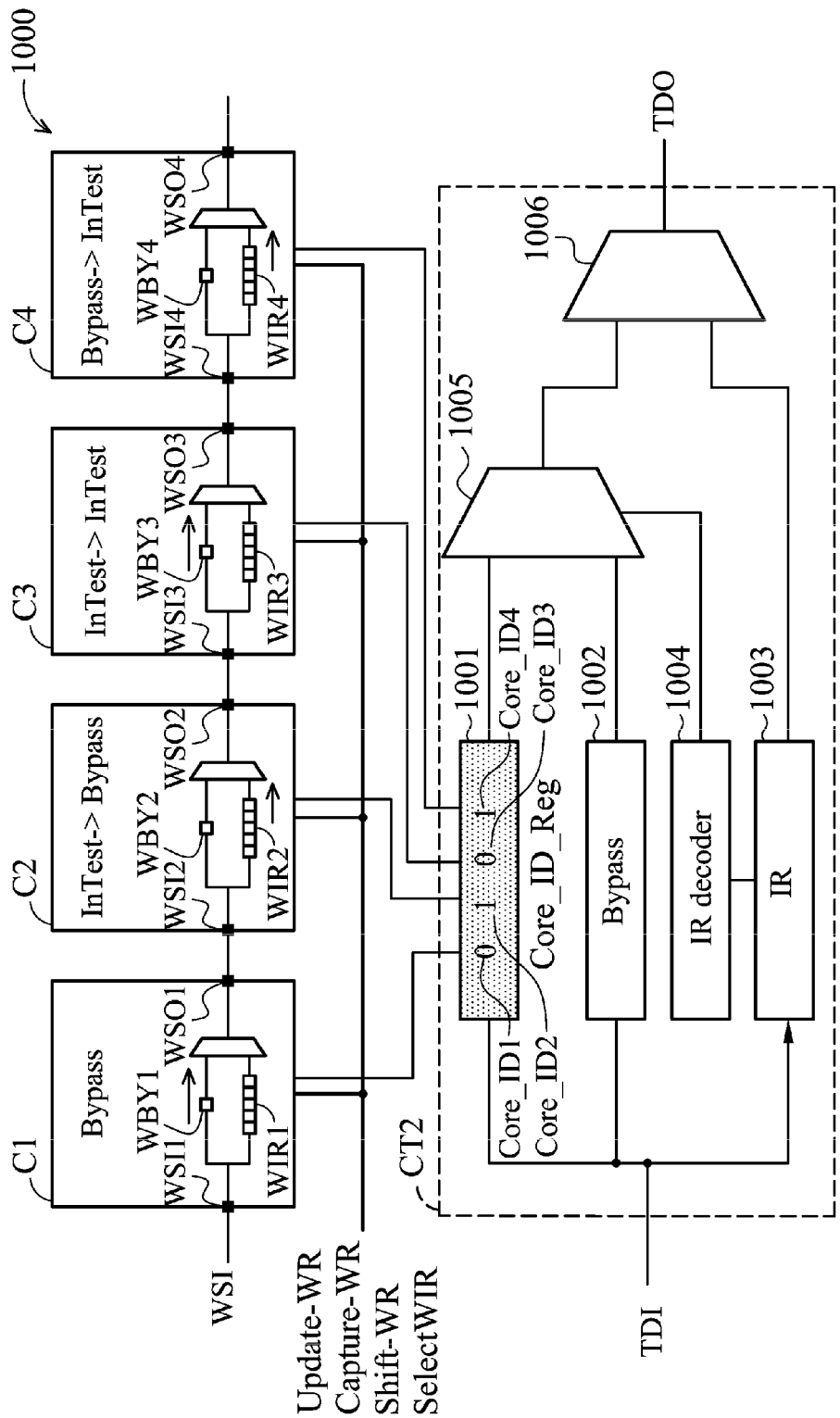
FIG. 10 is a schematic view of another embodiment of a test architecture for the IEEE 1500 standard of the exemplary embodiment consistent with the present invention.

FIG. 10 is a schematic view of another embodiment of a test architecture of the present invention. For the convenience of description of this invention, the WBR 601 and a multiplexer 605 of SIL in FIG. 6 are not shown is FIG. 10. In an embodiment, the test architecture 1000 comprises a test controller CT2, a test input port WSI, a test output port WSO and four cores (i.e. C1, C2, C3 and C4), wherein the test outputs WSO1, WSO2 and WSO3 are serial-connected to the test inputs WSI2, WSI3 and WSI4 of the cores respectively. Additionally, the test input port WSI is serial-connected to a test input WSI1 of core C1, and the test output port WSO is serial-connected to a test output WSO4 of core C4. The test controller CT2 is the same as the test controller CT1 shown in FIG. 7. The test control signals UpdateWR, CaptureWR, ShiftWR, SelectWIR and the bit of the register Core_ID_Reg 1001 are directly connected to each core (i.e. the user defined logics described in FIG. 7 are disposed inside of the cores respectively). When a test instruction of any one of the cores is needed to be updated, the corresponding bit of the register Core_ID_Reg 1001 is set to 1. For example, if the test instruction of the core C2 is updated from an InTest instruction to a bypass instruction, the corresponding bit Core_ID2 of the register CoreID_Reg is set to 1. If the test instruction of the core C4 is updated from a bypass instruction to an InTest instruction, the corresponding bit Core_ID4 of the register Core_ID_Reg is set to 1. When a test instruction of any one of the cores is not needed to be updated, the corresponding bit of the register Core_ID_Reg is set to 0. For example, if the test instruction of the core C1 and C3 are not needed to be updated, the corresponding bits (Core_ID1 and Core_ID3) of the register Core_ID_Reg are set to 0. Thus, the 4 bits of the register Core_ID_Reg are set to 0101 (as shown in FIG. 10). Accordingly, the test instructions of the core C2 and C4 are needed to be updated and the test instructions of the core C1 and C3 are not needed to be updated during a period of time.

Figure 11:
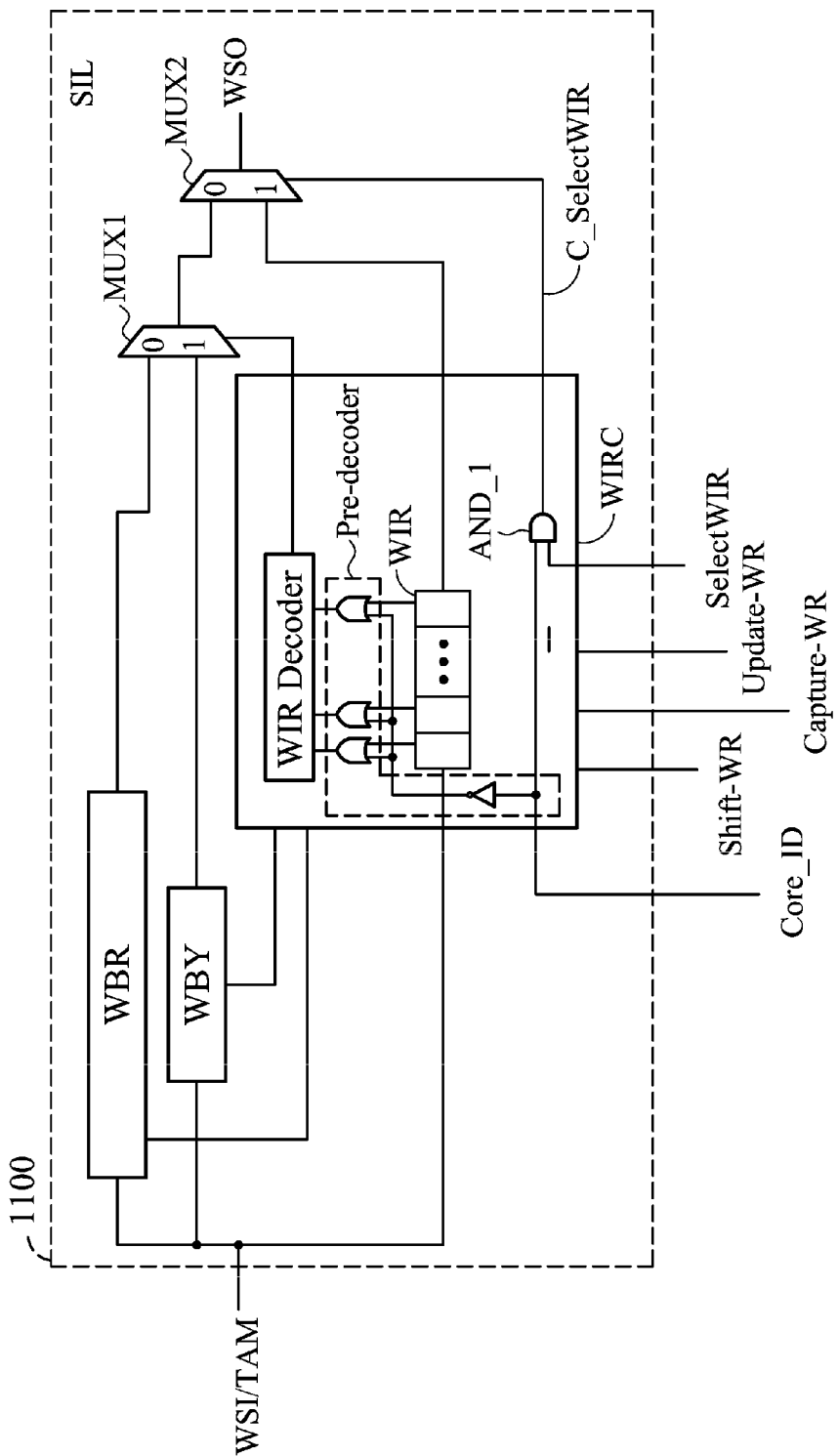
FIG. 11 is a schematic view of the SIL of each core in FIG. 10 of an embodiment of the present invention.

FIG. 11 shows a detail view of the SIL 1100 of each core in FIG. 10 of an embodiment of the present invention. The difference between the circuitry WIRC shown in FIG. 8 and the circuitry WIRC shown in FIG. 11 is that the UDL shown in FIG. 8 can be disposed in the circuitry WIRC. In one embodiment, the UDL comprises a plurality of OR gates, an AND gate and an inverter. The OR gates and the inverter form a pre-decoder between the WIR and WIR decoder to receive the test instruction of the WIR and change the test instruction into bypass instruction while the corresponding core is not selected by Core_ID_Reg for updating the test instruction. The UDL receives test control signals UpdateWR, CaptureWR, ShiftWR, and SelectWIR and receives the corresponding bit (Core_ID) of the register Core_ID_Reg to generate a set of signals to determine whether a test instruction of the corresponding core is or is not needed to be updated. In this embodiment, the set of control signals generated by the UDL at least comprise the signal C_SelectWIR. The AND gate AND_1 receives the test control signal SelectWIR and the corresponding bit (Core_ID) of the register Core_ID_Reg as its inputs, and outputs the signal C_SelectWIR. While Core_ID is 0 and SelectWIR is 1, C_SelectWIR is set to 0 and the WIR is set to 11 . . . 11 (i.e. the bypass instruction) by the pre-decoder, the multiplexer MUX2 is set to output the value of 0-input (i.e. the output of the MUX1), and the multiplexer MUX1 is set to output the value of 1-input (i.e. the output of the WBY) by the WIR decoder and the WIR decoder enables the WBY. If both of the Core_ID and SelectWIR are equal to 1, then C_SelectWIR is set to 1, the multiplexer MUX2 is set to output the value of 1-input (i.e. the output of WIR), and a test instruction is shifted into the WIR from the WSI port. If the Core_ID is equal to 1 and SelectWIR is equal to 0, then C_SelectWIR is set to 0, the multiplexer MUX2 is set to output the value of 0-input (i.e. the output of MUX1), the multiplexer MUX1 is set to output the value of 0-input (i.e. the output of WBR) or 1-input (i.e. the output of WBY), and the WIR decoder enables the WBR or the WBY according the decoding result of the test instruction by the WIR decoder. If both of the Core_ID and SelectWIR are equal to 0, then C_SelectWIR is set to 0, the multiplexer MUX2 is set to output the value of 0-input (i.e. the output of MUX1), the multiplexer MUX1 is set to output the value of 1-input (i.e. the output of WBY) by the WIR decoder, and the WBY is enabled by the WIR decoder. In other words, if Core_ID is equal to 0, the WSO port of the corresponding core is set to connect to the output of the WBY.

Figure 12:
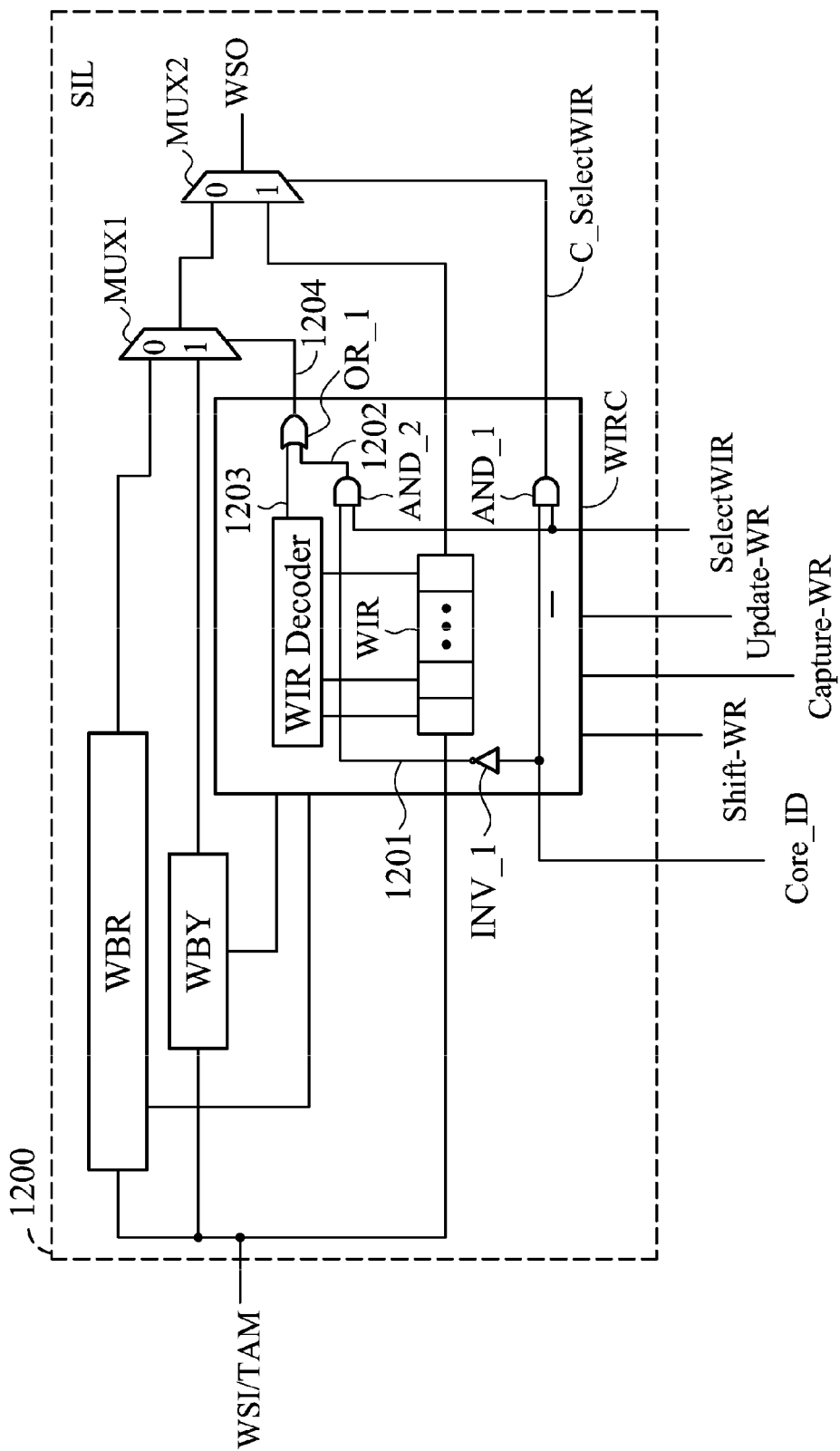
FIG. 12 is a schematic view of the SIL of each core in FIG. 10 of another embodiment of the present invention.

FIG. 12 shows a detail view of the SIL 1200 of each core in FIG. 10 of WIRC shown in FIG. 8 and the circuitry WIRC shown in FIG. 12 is that the UDL shown in FIG. 8 can be set in the circuitry WIRC. In one embodiment, the UDL comprises two AND gates (AND_1 and AND_2), an OR gate (OR_1) and an inverter (INV_1). The UDL receives test control signals UpdateWR, CaptureWR, ShiftWR, and SelectWIR and receives the corresponding bit (Core_ID) of the register Core_ID_Reg to generate a set of signals to determine whether a test instruction of the corresponding core is or is not needed to be updated. In this embodiment, the set of control signals generated by the UDL at least comprise the signal C_SelectWIR. The AND gate AND_1 receives the test control signal SelectWIR and the corresponding bit (Core_ID) as its inputs, and outputs the signal C_SelectWIR. When both of the Core_ID and SelectWIR are equal to 1, the output C_SelectWIR of AND gate AND_1 is set to be 1, the multiplexer MUX2 is set to output the value of 1-input (i.e. the output of WIR) and a test instruction is shifted from the WSI port to the WIR. When the Core_ID is equal to 1 and SelectWIR is equal to 0, the output C_SelectWIR of AND gate AND_1 is set to be 0, both outputs 1201 and 1202 of inverter INV_1 and AND gate AND_2 are set to be 0, and OR gate OR_1 couples the decoding result 1203 of WIR decoder to control signal 1204. The multiplexer MUX2 is set to output the value of 0-input, and the multiplexer MUX1 is set to output the value of 0-input or 1-input according to the output 1204 of OR gate OR_1. When the Core_ID is equal to 0 and SelectWIR is equal to 1, the output C_SelectWIR of AND gate AND_1 is equal to 0, both outputs 1201, 1202, 1204 of inverter INV_1, AND gate AND_2 and OR gate OR_1 are equal to 1, the multiplexer MUX2 is set to output the value of 0-input, and the multiplexer MUX1 is set to output the value of 1-input and the WIR decoder enables the WBY to bypass test instruction from WSI/TAM to WSO. When both of the Core_ID and SelectWIR are equal to 0, the outputs C_SelectWIR and 1202 of AND gates AND_1 and AND_2 are equal to 0, and OR gate OR_1 couples the decoding result 1203 of WIR decoder to control signal 1204. Then the multiplexer MUX2 is set to output the value of 0-input, and the multiplexer MUX1 is set to output the value of 0-input or 1-input to select the WBR or the WBY according the output 1204 of OR gate OR_1. In other words, if SelectWIR is set to 0, the multiplexer MUX1 is set to output the value of 0-input or 1-input according the decoding result of the WIR decoder.

Figure 13:
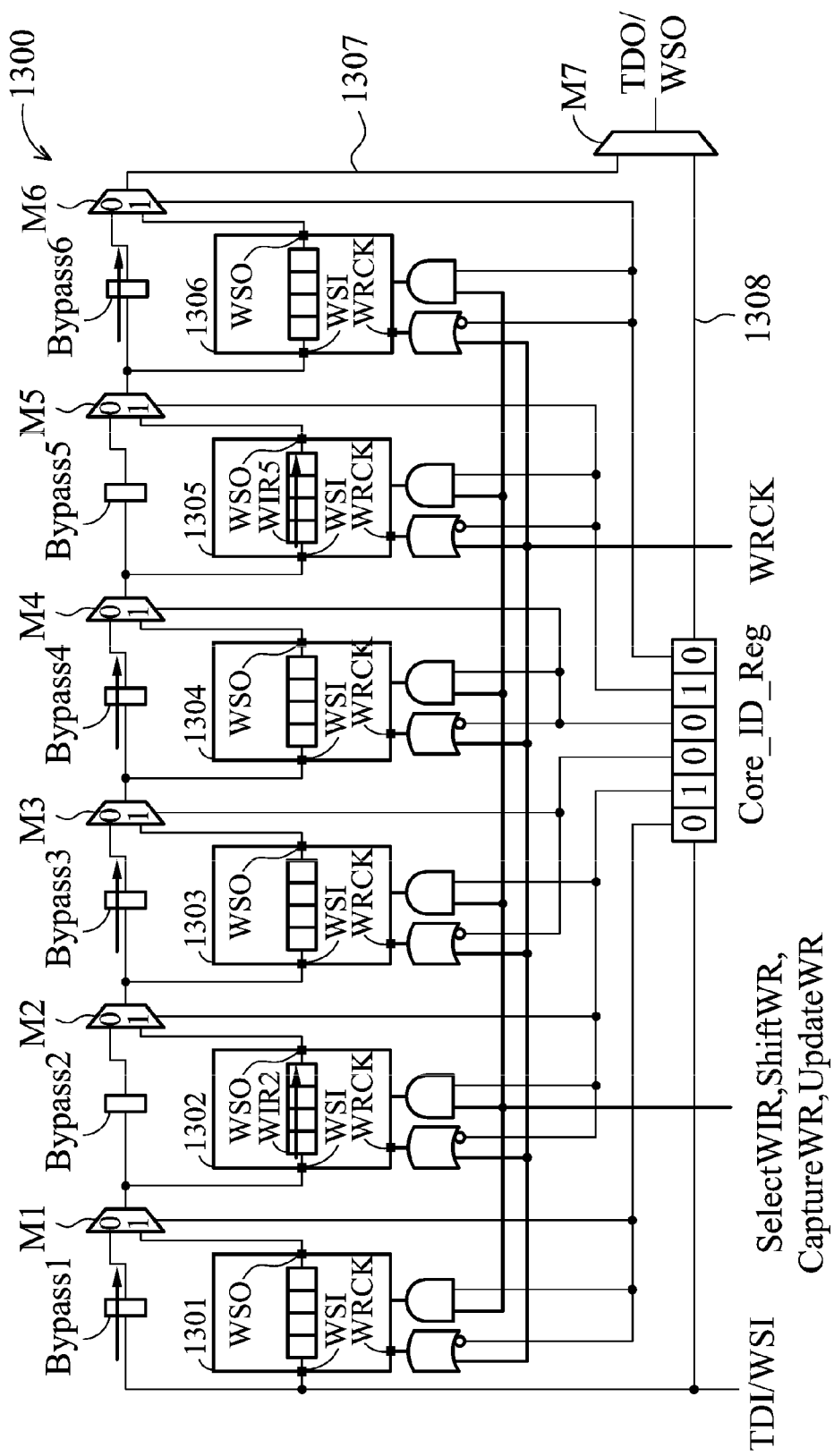
FIG. 13 is a schematic view of a wrapper circuit complying with the IEEE 1500 standard applying for parallel testing of the exemplary embodiment consistent with the present invention.

FIG. 13 is a schematic view of another embodiment of a test architecture for the IEEE 1500 standard of the present invention. The test architecture 1300 comprises a test input port (TDI/WSI), a test output port (TDO/WSO), a plurality of cores (1301~1306), AND gates, OR gates, D-flip-flops (DFFs, Bypass1~Bypass6), multiplexers (M1~M7), and a register Core_ID_Reg, wherein an input of each OR gate is connected to the output of an inverter and the input of the inverter is connected to the corresponding bit of the register Core_ID_Reg, another input of the OR gate is connected to the clock (WRCK). Each output of the OR gates is connected to corresponding test clock port WRCK of the cores, so that each test clock of cores could be disabled by the corresponding bit of the register Core_ID_Reg is set to be 0. The bits of the register Core_ID_Reg are corresponding to the cores. Each of the multiplexers M1~M6 receives a corresponding bit of the register Core_ID_Reg to be the selector input of the multiplexer. The OR gate, the AND gate, and the inverter of each of the cores form an UDL disposed outside of each of the cores. The DFFs are outside of the cores form the bypass registers Bypass1~Bypass6 for the corresponding cores. The inputs of the DFFs Bypass1~Bypass6 are connected to the WSI ports of the cores 1301~1306 respectively, and the outputs of the DFFs Bypass1~Bypass6 are connected to 0-inputs of the multiplexers M1~M6 respectively. The 1-inputs of the multiplexers M1~M6 are connected to the WSO ports of the corresponding cores respectively, and the outputs of the multiplexer M1~M5 are respectively connected to the WSI ports of cores 1302~1306 and the inputs of the DFFs Bypass2~Bypass6. Each of the multiplexers MUX1~M6 is controlled by the corresponding bit of the register Core_ID_Reg. The test input port TDI/WSI of the test architecture is connected to the WSI port of first core 1301 and the input of first DFF Bypass1, and the test output port TDO/WSO is the output of multiplexer M7. The inputs 1307 and 1308 of multiplexer M7 are connected to the outputs of M6 and the register Core_ID_Reg respectively. If the instruction of IR is to update the value of the register Core_ID_Reg, the multiplexer M7 outputs the value of wire 1308 to TDO/WSO, or the multiplexer M7 outputs the value of wire 1307. A plurality of AND gates are connected to each core for disabling the test control signals of the core (i.e. SelectWIR, ShiftWR, . . . etc.). The bits of the register Core_ID_Reg are connected to the inputs of the AND gates outside of the cores respectively. When a test instruction of any one of the cores is not needed to be updated, the corresponding bit of the register Core_ID_Reg is set to 0. For example, the test instruction of core 1301 is not needed to be updated, the path of the test data is from the WSI port to the 0-input of the multiplexer M1 through the DFF Bypass1, wherein the DFF Bypass1 and multiplexer M1 are disposed outside of the core (i.e. an additional bypass register and an additional multiplexer are disposed outside of the core). When the core is not selected to update its test instruction, the clock is set to 1 in order to disable the core. In other words, the corresponding bit of the register Core_ID_Reg is set to 0, the value of the clock is set to 1. Accordingly, when a test instruction of any one of the cores is not needed to be updated, the core doesn't consume energy because the clock is set to 1.

Figure 14:
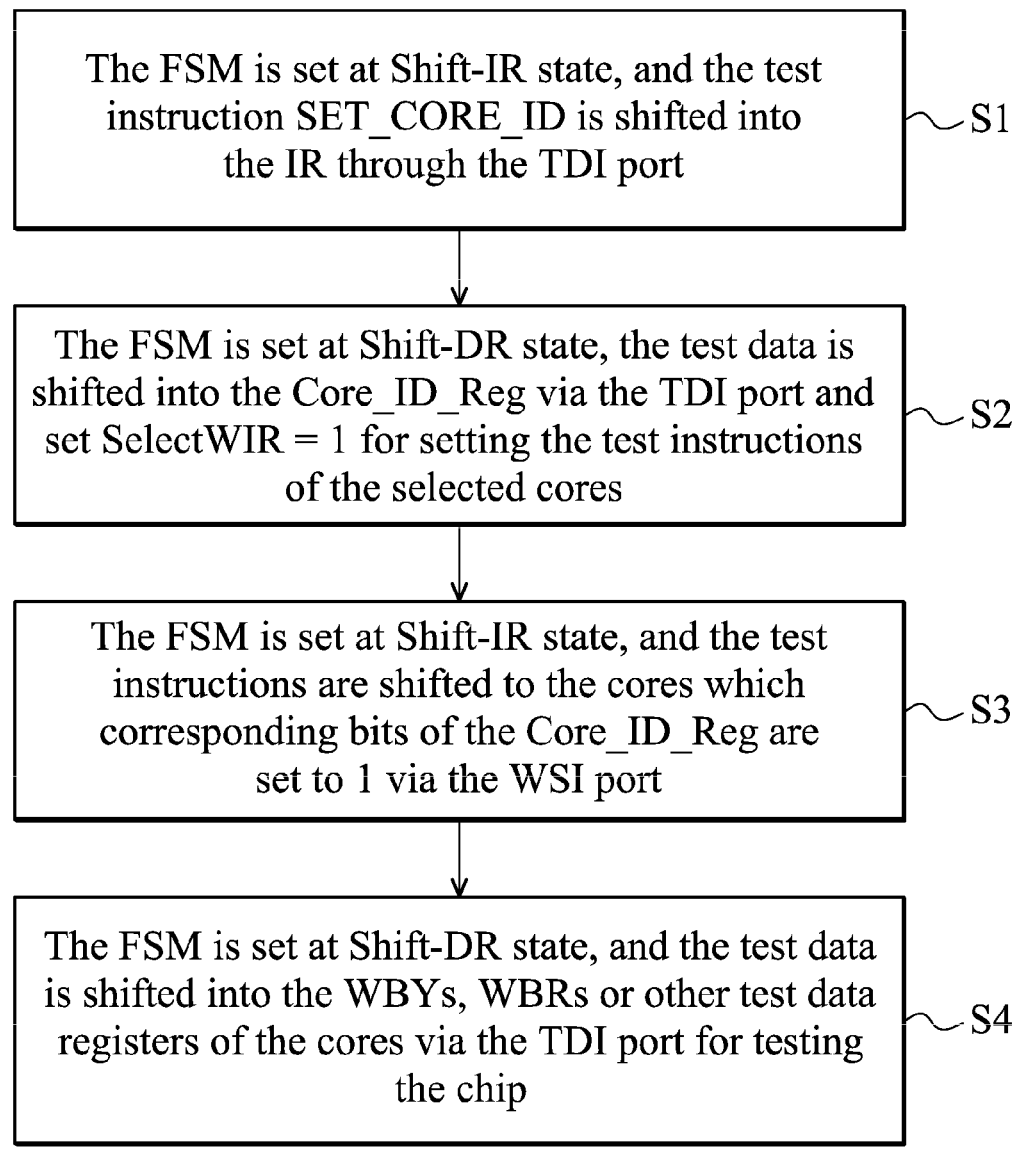
FIG. 14 is a flowchart of a test method for the SoC test architecture of the exemplary embodiment consistent with the present invention.

FIG. 14 is the test flow for the SoC test architecture of the exemplary embodiment consistent with the present invention.

Referring to FIGS. 7~12, when the test process starts, the FSM is set at the Shift-IR state in order to input a SET_CORE_ID instruction to the IR (step S1). Next, the FSM is set at the Shift-DR state in order to set the register Core_ID_Reg via the TDI port (step S2). For example, as shown in FIG. 10, the register Core_ID_Reg is set to 0101, which means that the test instructions of the core C1 and core C3 are not needed to be updated in the test process, and when the test instructions are shifted into the test architecture, the core C1 and core C3 are bypassed; which saves the instruction shifting time of the core C1 and core C3. If there are many cores in an SoC, then a lot of testing time in shifting the test instructions can be saved.

After set the bits of the Core_ID_Reg, the FSM is set to connect the WSI port of the test group, and disconnected the IR of the test controller. The FSM is set at the Shift-IR state in order to input the test instructions to the WIRs of the cores according to the values of the corresponding bits of the Core_ID_Reg, and SelectWIR is set to 1 (step S3). Test data is shifted from the WSI port to the WSO port through the WIRs or WBYs according to the values of the corresponding bits of the Core_ID_Reg.

After setting the test instructions of the cores, the test data can be shifted from WSI through WBY, WBR, or other user defined data registers according to the decoding results of the WIRs of the cores in the test group for testing the cores (step S4).

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A test device for the SoC test architecture, comprising:
m cores, wherein m is an integer, and i is an integer between 1 and m−1, wherein test outputs of a first core are serial-connected to test inputs of a second core, and test outputs of an $i^{th}$ core of the m cores are serial-connected to test inputs of an $(i+1)^{th}$ core of the m cores;
a test input port, wherein the test input port is serial-connected to test inputs of the first core of the m cores;
a test output port, wherein the test output port is serial-connected to test outputs of an $m^{th}$ core of the m cores;
a register, comprising m bits corresponding to the m cores; and
m user defined logics, each connected to a corresponding bit of the register and a corresponding one of the m cores, receiving a plurality of test control signals, receiving the corresponding bit of the register to change values of test control signals and outputting the changed test control signals, wherein the changed test control signals of each of the m user defined logics are connected to the corresponding core to determine whether a test instruction of the corresponding core is or is not needed to be updated;
wherein in each of the m cores which are selected to change the test instructions by the changed test control signals, the test instruction is shifted from the test input to a wrapper instruction register;
wherein in each of the m cores which are not selected to change the test instructions by the changed test control signals, test data is shifted from the test input to the test output through a bypass register.

2. The test device for the SoC test architecture as claimed in claim 1, wherein the m cores of the test group which are connected to the m user defined logics are composed of test wrappers complying with the IEEE 1500 standard which are serial-connected.

3. The test device for the SoC test architecture as claimed in claim 2, wherein the test control signals which are connected to the m user defined logics are complying with the IEEE 1500 standard.

4. The test device for the SoC test architecture as claimed in claim 1, wherein when any one of the bits in the register is set to 1, the test instruction of the core corresponding to the bit which is set to 1 is needed to be updated.

5. The test device for the SoC test architecture as claimed in claim 1, wherein when any one of the bits in the register is set to 0, the test instruction of the core corresponding to the bit which is set to 0 is not needed to be updated.

6. The test device for the SoC test architecture as claimed in claim 1, wherein an additional bypass register and an additional multiplexer are disposed outside of each core of the m cores for bypassing the corresponding core.

7. The test device for the SoC test architecture as claimed in claim 6, wherein when any one of the bits is set to 0, the core corresponding to the bit which is set to 0 is disabled.

8. A test device for the SoC test architecture, comprising:
m cores, wherein m is an integer, and i is an integer between 1 and m−1, whereis test outputs of a first core are serial-connected to test inputs of a second core, and test outputs of an $i^{th}$ core of the m cores are serial connected to test inputs of an $(i+1)^{th}$ core of the m cores;
a test input port, wherein the test input port is serial-connected to test inputs of the first core of the m cores;
a test output port, wherein the test output port is serial-connected to test outputs of an $m^{th}$ core of the m cores; and
a register, comprising m bits corresponding to the m cores, wherein each of the m cores comprises an user defined logic connected to a corresponding bit of the register, and receives a plurality of test control signals and the corresponding bit of the register, and changes values of the test control signals according to the corresponding bit of the register to determine whether a test instruction of the each core is or is not needed to be updated;
wherein in each of the m cores which are selected to change the test instructions by the changed test control signal, the test instruction is shifted from the test input to a wrapper instruction register;
wherein in each of the m cores which are not selected to change the test instructions by the changed test control signal, test data is shifted from the test input to the test output through a bypass register.

9. The test device for the SoC test architecture as claimed in claim 8, wherein each of the cores further comprises:
a wrapper boundary register;
a bypass register; and
a wrapper instruction register (WIR) circuit, comprising the user defined logic, wherein the WIR circuit is coupled to the wrapper boundary register and the bypass register and selectively enables the wrapper boundary register or the bypass register.

10. The test device for the SoC test architecture as claimed in claim 8, wherein when any one of the bits in the register is set to 1, the test instruction of the core corresponding to the bit which is set to 1 is needed to be updated.

11. The test device for the SoC test architecture as claimed in claim 8, wherein when any one of the bits in the register is set to 0, the test instruction of the core corresponding to the bit which is set to 0 is not needed to be updated.

* * * * *